United States Patent [19]

Yeol et al.

[11] Patent Number: 5,022,520
[45] Date of Patent: Jun. 11, 1991

[54] SLIDER LOCKING DEVICE OF DIGITAL AUDIO TAPE CARTRIDGE

[75] Inventors: Ryu M. Yeol, Chungnam; Ryu D. Ki, Seoul; Yun D. Kyun, Chungnam; An J. Kyu, Chungnam; Hong S. Kuk, Chungnam; Hong C. Euy, Chungnam; Ryu S. Sun, Chungnam, all of Rep. of Korea

[73] Assignee: SKC Limited, Kyungki, Rep. of Korea

[21] Appl. No.: 436,482

[22] Filed: Nov. 14, 1989

[30] Foreign Application Priority Data

Dec. 7, 1988 [KR] Rep. of Korea ............... 8820194

[51] Int. Cl.$^5$ .................. B65D 85/02; A44B 19/00
[52] U.S. Cl. ...................... 206/315.1; 242/197; 242/199; 24/662
[58] Field of Search .............. 206/315.1; 242/197, 242/199; 24/587, 297, 573, 662, 324, 576

[56] References Cited

U.S. PATENT DOCUMENTS

| | | | |
|---|---|---|---|
| 4,294,418 | 10/1981 | Gell | 242/197 |
| 4,683,510 | 7/1987 | Meguro | 242/199 X |
| 4,694,369 | 9/1987 | Ramsay | 242/199 X |
| 4,697,702 | 10/1987 | Urayama | 242/199 X |
| 4,863,286 | 9/1989 | Beanson | 24/587 X |

*Primary Examiner*—Daniel P. Stodola
*Assistant Examiner*—John P. Darling
*Attorney, Agent, or Firm*—Ladas & Parry

[57] ABSTRACT

In digital audio tape cartridge, the tape cartridge has an improved a slider locking device. The slider in which opening position locking holes and closing position locking holes are bored for the selective locking of locking projections, is engaged with the lower shell and the elastic piece of elastic locker makes in to "a both ends-fixed beam" with its both ends integrated with the lower shell and forms the locking projections in the middle part of elastic piece.

The elasticity of the elastic piece of elastic locker which forms the slider locking device is maintained so properly that the slider locking action of elastic locker is achieved correctly and the cartridge enjoys a long life even when it is used for a long time.

15 Claims, 3 Drawing Sheets

SLIDER LOCKING DEVICE OF DIGITAL AUDIO TAPE CARTRIDGE

The present invention relates to a digital audio tape cartridge. In particular, it relates to a slider locking device of digital audio tape cartridge which, by being slidably installed in the bottom of cartridge, opens and closes reel axis insertion holes and, at the same time, locks a slider which restricts opening or closing of the lid at the opening position and at the closing position.

Generally speaking, the digital audio tape cartridge (21) heretofore in use comprises, as illustrated in FIG. 6 and FIG. 7, the upper shell (22) and the lower shell (23) which accommodate a tape wound onto a pair of reels (not illustrated), a slider (24) which is slidably installed in the bottom of lower shell (23) and a lid (25) which opens the front side of cartridge (21).

In the bottom of the said lower shell (23), a pair of insertion holes (26) into which a reel axis installed on the deck (not illustrated) of digital audio tape recorder which will be put to a tape reel in the inside will be inserted are bored and, in the said slider (24), a pair of communicating holes (27) which correspond with a pair of reel axis insertion holes (26) at the opening position are bored.

The aforesaid slider (24) and lid (25) are installed at the closing position by a spring at all times.

In the said lower shell (23) and slider (24) a locking device which locks the slider (24) at the opening position and at the closing position in installed.

The slide locking device comprises an elastic piece integrally formed with the lower shell (23), a pair of elastic lockers (28) provided with a locking projection (30) projecting downward at its front end and each pair of open position locking holes (31) and open position locking holes (32) which are bored in the slider (24) and into which the locking projections (30) of elastic lockers (28) are selectively locked at the opening position and at the closing position.

Such a digital audio tape cartridge (21) is kept locked by that the slider (24) makes an elastic comeback to the front at all times and closes the reel axis insertion holes (26) when the said communicating holes (27) go crisscross therewith and, at the same time, the locking projections (30) of elastic lockers (28) formed in the lower shell (23) are caught in the closing position locking holes (32) bored in the slider (24) at the closing position where the lid (25) is kept closed.

In such a condition, the reel in the inside of cartridge (21) is not exposed as it is closed by the slider (24) and the tape in the inside is protected from dust or alien matters and, at the same time, kept away therefrom as it is closed by the lid (25).

When the cartridge (21) is loaded on the deck (not illustrated) of digital audio tape recorder, locking between locking projections (30) and closing position locking holes (32) is released by a lock release means installed in the deck according as the cartridge (21) moves in and, as the slider (24) makes a backward movement, the communication holes (27) correspond with the reel axis insertion holes (26) in the lower shell (23) and so the reel axis insertion holes (26) are thereby made to open and, at the same time, the locking projections (30) are caught in the open position locking holes (31) under the condition that the lid (25) is open. Thus, the cartridge (21) is kept in a locked condition.

In such a condition, the reel axis of deck is inserted into the reel within the cartridge through the communicating holes (27) and the reel axis insertion holes (26) and the tape is safely seated in an exposed condition according as the lid (25) is open.

On the other hand, when the cartridge (21) seated in the deck is ejected, locking between locking projections (30) and open position locking holes (31) is released by the lock release means installed in the deck according as the cartridge moves backward and, as the slider (24) makes a comeback elastically by moving forward, the reel axis insertion holes (26) are closed and, at the same time, the lid (25) is ejected in a condition where it is ketp at the closing position. Thus, the cartridge (21) is put in normal condition.

As the locking action of slider locking device in the use of such a cartridge (21) is achieved by the elastic force provided by the elastic piece (29) of elastic locker (28), it is necessary for the elastic piece (29) to maintain its elasticity at a proper level.

In the case of the cartridge (21) heretofore in use, however, it involves a problem in that the elastic force of elastic piece (29) is gradually weakened by its use and the locking action of elastic locker (28) is not achieved correctly and the digital audio tape recorder is accordingly made to fall into an error by reason that one end of the elastic piece (29) of elastic locker (28) which forms the slider locking device is integrated with the lower shell (23) and its other end provided with a locking projection (30) is formed into an one-armed beam which is a free end.

The object of the present invention is to provide a slider locking device of digital audio tape cartridge by which the elasticity of the elastic piece of elastic locker which forms the slider locking device is maintained so properly that the slider locking action of elastic locker is achieved correctly and the cartridge enjoys a long life even when it is used for a long time and, moreover, the digital audio tape recorder is prevented from falling into a error caused by the cartridge.

The object of the present invention as described hereinbefore is accomplished by providing a slider locking device of digital audio tape cartridge which has a slider slidably installed in the upper and lower shells which accommodate a tape and in the bottom of the lower shell and an opening/closing lid and integrally forms an elastic locker having an elastic piece and a locking projection at its front end with the lower shell and, in the slider in which opening position locking holes and closing position locking holes are bored for the selective locking of locking projections, makes the elastic piece of elastic locker into "a both ends-fixed beam" with its both ends integrated with the lower shell and forms the said locking projections in the middle part of elastic piece.

Regarding the elastic piece of elastic locker, any elastic piece will do, if its both ends are integrally fixed with the lower shell. The "L"-shaped or "l"-shaped piece is desirable.

Other characteristics and merits of the present invention will become apparent by the detailed description of its embodiments according to the drawings attached hereto.

The digital audio tape cartridge to which the present slider locking device of digital audio tape cartridge formed in such a manner is applied is kept locked by that the slider makes an elastic comeback to the front at all times and closes the reel axis insertion holes when the said communicating holes go crisscross therewith and, at the same time, the locking projections of elastic lockers formed in the lower shell are caught in the closing position locking holes bored in the slider where the lid is kept closed.

In such a condition, the reel in the inside of cartridge is not exposed as it is closed by the slider and the tape in the inside is protected from dust or alien matters and, at the same time, kept away therefrom, as it is closed by the lid (25).

When the cartridge is loaded on the deck of digital audio tape recorder, locking between locking projections and closing position locking holes is released by a lock release means installed in the deck according as it moves in and, as the slider moves backward, the communicating holes correspond with the reel axis insertion holes in the lower shell and so reel axis insertion holes are thereby made to open and, at the same time, the locking projections are caught in the opening position locking holes under the condition that the lid is open. Thus, the cartridge is kept in a locked condition.

In such a condition, the reel axis of deck is inserted into the reel within the cartridge through the communicating holes and the reel axis insertion holes and the tape is safely seated in an exposed condition according as the lid is open.

On the other hand, when the cartridge seated on the deck is ejected, locking between locking projections and opening position locking holes is released by the lock release means installed in the deck according as it moves backward and, as the slider makes a comeback elastically by moving forward, the reel axis insertion holes are closed and the lid is ejected in a condition where it is kept at the closing position. Thus, the cartridge is put in normal condition.

The locking action of slider locking device is achieved by the elastic force provided by the elastic piece of elastic locker.

As the present locker is formed into a both ends fixed beam in which both ends of elastic piece are integrated with the lower shell and a locking projection is formed in the middle part thereof, the elasticity for slider locking can be set at a proper level and the elasticity of elastic piece is not easily reduced but kept for smooth locking operation even when used for a long time.

BRIEF DESCRIPTION OF THE DRAWINGS

In the drawings,

FIG. 1 is an exploded view of cartridge.

FIG. 2 is a bottom view of important part showing that a slider is removed.

FIG. 3 is a cross-sectional view of combination along the A—A line of FIG. 2.

FIG. 4 is a cross-sectional view of combination along the B—B line of FIG. 2.

FIG. 6 is a disassembled strabismal view of cartridge.

FIG. 7 is a cross-sectional view of important part.

FIG. 1 through FIG. 4 illustrate one embodiment of the present invention.

Figure 1:
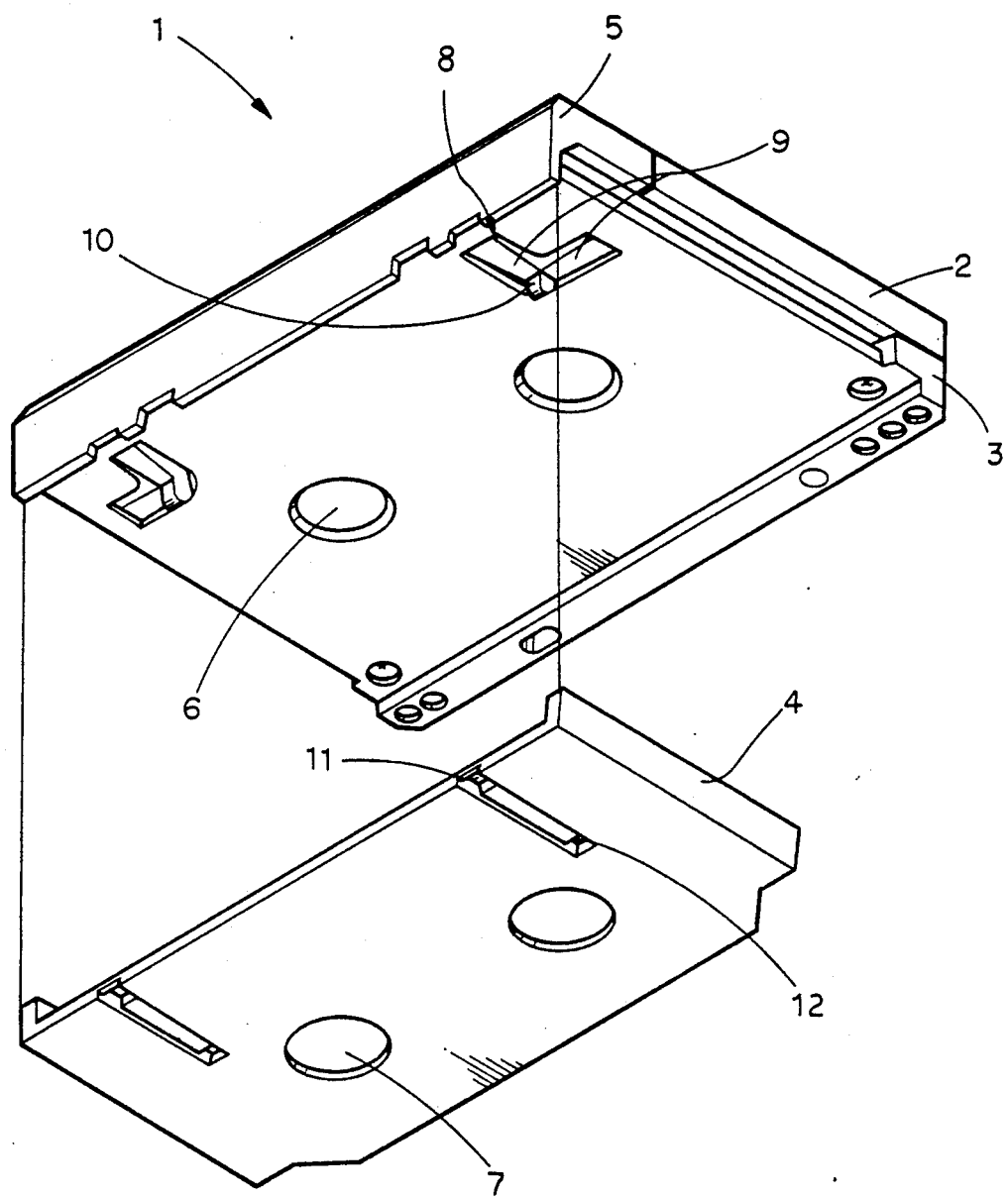
FIG. 1 to FIG. 4 illustrate one embodiment of a slider locking device of digital audio tape cartridge.

The digital audio tape cartridge (1) comprises the upper and lower shells (2) (3) which accommodate a tape (not illustrated) wound onto a pair of reels, a slider (4) which is slidably installed in the bottom of the lower shell and a lid (5) which opens/closes the front side of the upper and lower shells (2) (3).

In the bottom of the said lower shell (3), a pair of reel axis insertion holes (6) into which a reel axis installed on the deck (not illustrated) of digital audio tape recorder which is put to a tape reel in the inside is inserted are bored and, in the slider (4), a pair of communicating holes (7) which correspond with the reel axis insertion holes (6) at the opening position are bored.

The aforesaid slider (4) and lid (5) are elastically installed at the closing position by a spring at all times.

In the said lower shell (3) and slider (4), a locking device which locks the slider (4) at the opening position is installed. This slider locking device comprises a pair of elastic lockers (8) which have an elastic piece (9) integrated with the lower shell (3) and a locking projection (10) formed at its front end and each pair of opening position locking holes (11) and opening position locking holes (12) which are bored in the slider (4) for the selective locking of the locking projections (10) of elastic lockers (8) at the opening position and at the closing position.

Such a digital audio tape cartridge (1) is kept locked by the slider (4) makes an elastic comeback to the front at all times and closes the reel axis insertion holes (6) when the communicating holes (7) go crisscross therewith and, at the same time, the locking projections (10) of elastic lockers (8) formed in the lower shell are caught in the closing position locking holes (12) bored in the slider (4) at the closing position where the lid (5) is kept closed.

In such a condition, the reel in the inside of cartridge (1) is not exposed as it is closed by the slider (4) and the tape in the inside is protected from dust and alien matters and, at the same time, kept away therefrom as it is closed by the lid (5).

When the cartridge (1) is loaded on the deck (not illustrated) of digital audio tape recorder, locking between locking projections (10) and closing position locking holes (12) is released by a lock release means installed in the deck according as the cartridge (1) moves in and, as the slider (4) moves backward, communicating holes (7) correspond with the reel axis insertion holes (6) in the lower shell (3) and so the reel axis insertion holes (6) are thereby made to open and, at the same time, the locking projections (10) are caught in the opening position locking holes (11) under the condition that the lid (5) is open. Thus, the cartridge (1) is kept in a locked condition.

In such a condition, the reel axis of the deck is inserted into the reel within the cartridge (1) through the communicating holes (7) and the reel axis insertion holes (6) and the tape is safely seated in an exposed condition according as the lid (5) is open.

On the other hand, when the cartridge (1) seated on the deck is ejected, locking between locking projections (10) and opening position locking holes (11) is released by the lock release means installed in the deck according as the cartridge (1) moves backward and, as the slider (4) makes a comeback elastically by moving forward, the reel axis insertion holes (6) are closed and, at the same time, the lid (5) is ejected in a condition where it is kept at the closing position. Thus, the cartridge (1) is put in normal condition.

The elastic piece of the said elastic locker is formed into a both ends fixed beam in which both ends are integrated with the lower shell and the said locking projections are formed in the middle part of elastic piece.

Figure 2:
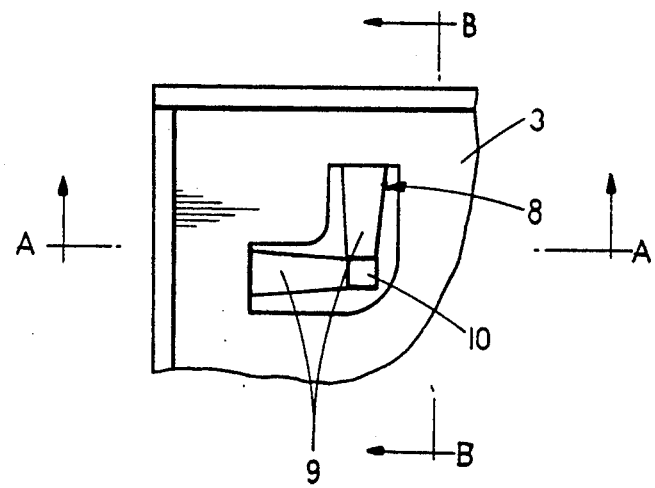
Figure 3:
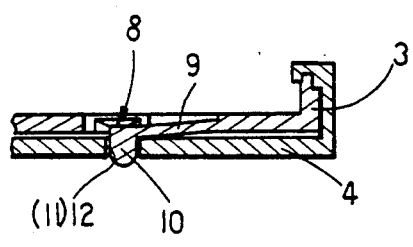
Figure 4:
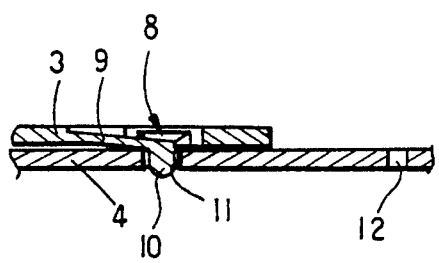

The aforesaid elastic piece (9) being "L"-shaped with its both ends integrated with the lower shell as illustrated in FIG. 1 and FIG. 2, its elasticity which acts as slider locking force can be kept at a proper level. It is also usable for long, being not weakened even when used for a long time.

Figure 5:
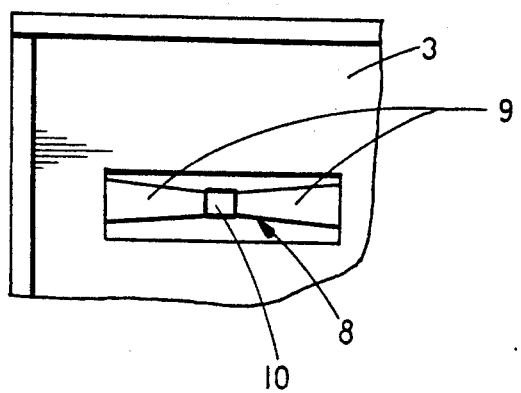
FIG. 5 is a bottom view of important part showing another embodiment of the present invention.
Figure 6:
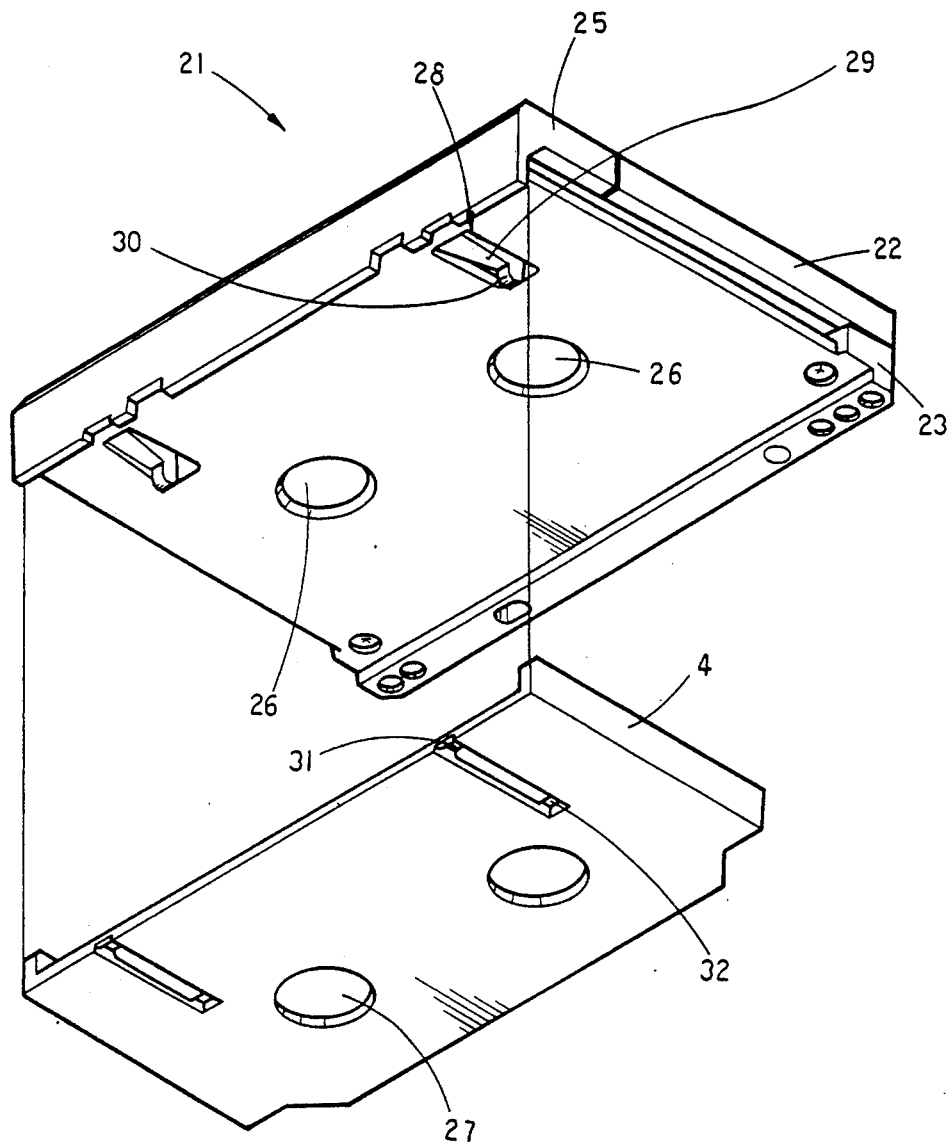
FIG. 6 and FIG. 7 illustrate a slider locking device of digital audio tape cartridge heretofore in use.
Figure 7:
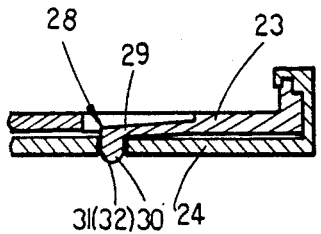

FIG. 5 illustrates another embodiment of the present invention.

The elastic piece (9) of the said elastic locker (8) is formed into a both ends fixed beam with its both ends integrated with the lower shell (3). By being "1"-shaped, however, its elasticity which acts as slider (4) locking force can be set so properly as to be usable for a long time without a decline.

Other parts being the same as in the said embodiments, the same symbols are given to the same parts and a concrete explanation thereof is not given.

As described hereinabove, the present invention sets its elasticity at a proper level as the elastic piece of its elastic locker which provides slider locking force is formed into a both ends fixed beam with its both ends integrated with the lower shell and locking projections are formed in the middle part of elastic piece, prevents the slider from falling into an error when the cartridge is loaded on and ejected from the digital audio tape recorder as the elasticity set at first is not easily weakened even when used for a long time, prolongs the life of cartridge and, furthermore, prevents the digital audio tape recorder from operating in an erroneous way.

What is claimed is:

1. A slider locking device comprising:
    an upper shell;
    a lower shell associated with said upper shell, said lower shell having a generally planer base and defining therein an elastically deformable locking piece, said elastically deformable locking piece having two ends integrated with the base of said lower shell;
    a locking projection formed generally in the middle part of said elastically locking piece; and
    a slider slidably received in the upper and lower shells, said slider defining in its surface two openings, wherein when said slider is moved into a closed position in said upper and lower shells, said projection engages one of said two openings and when said slider is moved into an open position in said upper and lower shells said projection engages the other of said two openings.

2. The slider locking device as claimed in claim 1, wherein said elastically deformable locking piece is "L"-shaped with both its free ends integrated with the lower shell such that said "L"-shape is generally coplaner with said base of said lower shell.

3. The slider locking device as claimed in claim 1, wherein said elastically deformable locking piece is "1"-shaped with its both ends integrated with the lower shell.

4. The device of claim 1 wherein said projection is formed integrally with said locking piece.

5. A slider locking device comprising:
    a lower shell defining in its surface an elastic locker having two ends, said two ends being integrally attached to said lower shell;
    an elastic piece extending between said two ends;
    a locking projection formed generally centrally on said elastic locker and extending from said elastic piece, said elastic locker being generally coplanar with said lower shell;
    a slider slidably engagable with said lower shell, said slider defining in its surface a first opening and a second opening, such that said projection engages said first opening when said slider is in a first position with respect to said lower shell and said projection engages said second opening when said slider is slid to a second position with respect to said lower shell.

6. The sliding locking device of claim 5 wherein said elastic locker is "L"-shaped with its two free ends forming the two ends which are integral with said lower shell.

7. The sliding locking device of claim 5 wherein said elastic locker is "1"-shaped with its both ends being the two ends which are integrally attached to said lower shell.

8. The device of claim 5 wherein said projection is formed integrally with said elastic piece and wherein said elastic piece is formed integrally with said elastic locker.

9. A locking slider device comprising:
    a lower shell extending largely along one plane;
    at least one elastic locker having two ends which are integrally joined to said lower shell;
    an elastic piece extending generally between said two ends such that said elastic piece and said two ends are generally coplanar with said lower shell;
    a projection extending from said elastic piece; and
    a slider slidably engagable with said lower shell, said slider having locking means,
    wherein said elastic locker may be elastically deformed from its generally coplanar orientation with said lower shell to facilitate the engagement and disengagement of said protrusion with said locking means of.

10. The device of claim 9 wherein said elastic locker is in the shape of an "1."

11. The device of claim 10 wherein said protrusion is located generally centrally of said elastic locker.

12. The device of claim 9 wherein said elastic locker is in the shape of an "L."

13. The device of claim 12 wherein said protrusion is located generally centrally of said elastic locker.

14. The device of claim 9 wherein said protrusion is located generally centrally of said elastic locker.

15. The device of claim 9 wherein said projection is formed integrally with said elastic piece.

* * * * *